US012408119B2

(12) United States Patent
Yoon et al.

(10) Patent No.: US 12,408,119 B2
(45) Date of Patent: Sep. 2, 2025

(54) METHOD FOR CONTROLLING SIGNAL AND WEARABLE DEVICE SUPPORTING THE SAME

(71) Applicant: SAMSUNG ELECTRONICS CO., LTD., Suwon-si (KR)

(72) Inventors: Jongmin Yoon, Suwon-si (KR); Chulkwi Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 18/095,741

(22) Filed: Jan. 11, 2023

(65) Prior Publication Data
US 2023/0164703 A1 May 25, 2023

Related U.S. Application Data

(63) Continuation of application No. PCT/KR2022/017747, filed on Nov. 11, 2022.

(30) Foreign Application Priority Data

Nov. 12, 2021 (KR) .................. 10-2021-0155824
Jan. 14, 2022 (KR) .................. 10-2022-0005954

(51) Int. Cl.
H04W 52/28 (2009.01)
(52) U.S. Cl.
CPC ................ H04W 52/285 (2013.01)
(58) Field of Classification Search
CPC .... H04W 52/285; G06F 1/163; G06F 3/0346; G06F 1/3278; G01S 17/42; G01S 17/50
See application file for complete search history.

(56) References Cited

U.S. PATENT DOCUMENTS 6,879,252 B2 * 4/2005 DeZorzi .............. B60C 23/0416
340/447
9,591,470 B2 3/2017 Julian et al.
(Continued)

FOREIGN PATENT DOCUMENTS

KR 10-2015-0092226 A 8/2015
KR 10-2016-0016555 A 2/2016
(Continued)

OTHER PUBLICATIONS

Communication dated Feb. 23, 2023, issued by the International Searching Authority in counterpart International Application No. PCT/KR2022/017747 (PCT/ISA/210).
(Continued)

Primary Examiner — Dominic E Rego
(74) Attorney, Agent, or Firm — Sughrue Mion, PLLC

(57) ABSTRACT

A wearable device includes a first sensor, at least one second sensor, and at least one processor configured to control the first sensor to transmit a first signal with a first strength, identify a position of a first object based on a first response signal to the first signal, based on the identified position of the first object, control the first sensor to transmit a second signal with a second strength corresponding to a first distance between the wearable device and the first object, detect, by using the at least one second sensor, a movement of the wearable device, the movement of the wearable device including at least one of a position change of the wearable device and a direction change of the wearable device, and determine whether to adjust the second strength, based on the movement of the wearable device and the position of the first object.

20 Claims, 12 Drawing Sheets

(56) References Cited

U.S. PATENT DOCUMENTS

| | | | |
|---|---|---|---|
| 9,793,981 B2* | 10/2017 | Lee | G06F 1/3215 |
| 9,851,787 B2 | 12/2017 | Latta et al. | |
| 10,554,886 B2 | 2/2020 | Rydberg | |
| 11,253,624 B2* | 2/2022 | Jones | A61L 9/037 |
| 11,290,166 B2 | 3/2022 | Kim et al. | |
| 11,405,594 B2 | 8/2022 | Lee | |
| 11,740,333 B2 | 8/2023 | Droz et al. | |
| 11,860,439 B1* | 1/2024 | Hossain | G06T 3/14 |
| 11,989,965 B2* | 5/2024 | Tarighat Mehrabani | G06V 10/82 |
| 2010/0081403 A1* | 4/2010 | Reial | H04B 7/086 |
| | | | 455/136 |
| 2011/0090065 A1* | 4/2011 | Overhultz | G06K 7/10316 |
| | | | 340/10.42 |
| 2015/0301574 A1* | 10/2015 | Kim | G06F 1/3265 |
| | | | 345/156 |
| 2016/0209944 A1* | 7/2016 | Shim | G06F 3/04166 |
| 2017/0223337 A1 | 8/2017 | Sung et al. | |
| 2018/0081061 A1 | 3/2018 | Mandai et al. | |
| 2019/0230615 A1* | 7/2019 | Werner | B60C 23/0408 |
| 2020/0033481 A1 | 1/2020 | Lee | |
| 2020/0064942 A1* | 2/2020 | Chang | G06F 3/0383 |
| 2020/0142497 A1* | 5/2020 | Zhu | G06F 1/163 |
| 2020/0302775 A1* | 9/2020 | Liu | G06K 7/10366 |
| 2021/0195551 A1* | 6/2021 | Kuang | H04W 4/029 |
| 2021/0235172 A1* | 7/2021 | Wohlschlager | H04Q 9/00 |
| 2021/0379452 A1* | 12/2021 | Francis | A63B 41/08 |
| 2021/0379483 A1* | 12/2021 | Fujimoto | A63F 9/24 |
| 2022/0149958 A1 | 5/2022 | Lee et al. | |
| 2022/0272792 A1* | 8/2022 | Werner | G16Y 30/00 |
| 2023/0080188 A1* | 3/2023 | Zhang | G01S 5/0284 |
| | | | 340/870.07 |

FOREIGN PATENT DOCUMENTS

| | | |
|---|---|---|
| KR | 10-2016-0096926 A | 8/2016 |
| KR | 10-2019-0104478 A | 9/2019 |
| KR | 10-2019-0126773 A | 11/2019 |
| KR | 10-2020-0116727 A | 10/2020 |
| KR | 10-2021-0010437 A | 1/2021 |
| KR | 10-2021-0023050 A | 3/2021 |
| KR | 10-2021-0105720 A | 8/2021 |
| WO | 2020/083105 A1 | 4/2020 |

OTHER PUBLICATIONS

Communication dated Feb. 23, 2023, issued by the International Searching Authority in counterpart International Application No. PCT/KR2022/017747 (PCT/ISA/237).

European Extended Search Report issued Feb. 3, 2025 by the European Patent Office for EP Patent Application No. 22893267.9.

* cited by examiner

METHOD FOR CONTROLLING SIGNAL AND WEARABLE DEVICE SUPPORTING THE SAME

CROSS-REFERENCE TO RELATED APPLICATION(S)

This application is a bypass continuation of International Application No. PCT/KR2022/017747, filed on Nov. 11, 2022, in the Korean Intellectual Property Receiving Office, which is based on and claims priority to Korean Patent Application No. 10-2022-0005954, filed on Jan. 14, 2022, in the Korean Intellectual Property Office, and Korean Patent Application No. 10-2021-0155824, filed on Nov. 12, 2021, in the Korean Intellectual Property Office, the disclosures of which are incorporated herein by reference in their entireties.

BACKGROUND

1. Field

The disclosure relates generally to a method for controlling a signal and a wearable device supporting the same.

2. Description of Related Art

As the mobile market reaches maturity, a wearable electronic device capable of interworking with an existing mobile device is developed. The wearable device operates while being worn on (or attached to) a user's body part, and may thus provide various pieces of information about the front of the user. For example, the wearable device worn on the user's body part may transmit a signal toward the front, may detect an object disposed in the front, based on a response signal reflected from the object, and may determine the position of the object.

When the position of the object is determined, the wearable device may adjust the strength of a signal transmitted toward the front. For example, the wearable device may adjust the strength of the signal gradually (or by stages) such that the transmitted signal reaches a distance corresponding to the determined position of the object.

However, the wearable device does not provide a solution in which a movement of the wearable device is reflected in adjusting the strength of the transmitted signal. In this case, the wearable device repeats a series of processes of transmitting a signal with a maximum strength to the front corresponding to a movement of the wearable device whenever the movement is detected and gradually adjusting the strength of the signal according to the position of a detected object. The series of processes repeated according to the movement of the wearable device may increase power consumption of the wearable device and may reduce available time of the wearable device.

SUMMARY

Provided are a signal control method and a wearable device supporting the same for adaptively adjusting the strength of a signal for detecting an object, based on a movement of the wearable device.

Additional aspects will be set forth in part in the description which follows and, in part, will be apparent from the description, or may be learned by practice of the presented embodiments.

According to an aspect of the disclosure, a wearable device may include a first sensor, at least one second sensor, and at least one processor configured to control the first sensor to transmit a first signal with a first strength, identify a position of a first object based on a first response signal to the first signal, based on the identified position of the first object, control the first sensor to transmit a second signal with a second strength corresponding to a first distance between the wearable device and the first object, detect, by the at least one second sensor, a movement of the wearable device, the movement of the wearable device including at least one of a position change of the wearable device and a direction change of the wearable device, and determine whether to adjust the second strength, based on at least one of the movement of the wearable device and the position of the first object.

The at least one processor may be further configured to identify, by the at least one second sensor, whether the wearable device is moving in a first moving direction, control the first sensor to transmit the first signal in a first direction toward the first object based on identifying that the wearable device is moving in the first moving direction, and control the first sensor to transmit a third signal corresponding to a second distance between a position of the wearable device and the first object and having a different strength from the first strength.

The at least one processor may be further configured to control the first sensor to transmit the third signal based on whether a second response signal to the first signal is received from a second object different from the first object.

The at least one processor may be further configured to identify, by the at least one second sensor, whether the wearable device is moving in a second moving direction opposite to the first moving direction, and control the first sensor to transmit a fourth signal corresponding to a third distance between the position of the wearable device and the first object and having a different strength from the first strength based on identifying that the wearable device is moving in the second moving direction.

The first sensor may include a plurality of light emitting units, and the at least one processor may be further configured to identify, by the at least one second sensor, whether the wearable device is turning in a first turning direction, control the first sensor such that at least one first light emitting unit of the plurality of light emitting units transmits the second signal in a second direction toward the first object based on identifying that the wearable device is turning in the first turning direction, and control the first sensor such that at least one second light emitting unit different from the at least one first light emitting unit among the plurality of light emitting units transmits the first signal in a direction different from the second direction toward the first object.

The at least one processor may be further configured to identify, by the at least one second sensor, whether the wearable device is turning in a second turning direction opposite to the first turning direction, control the first sensor such that at least one third light emitting unit of the plurality of light emitting units transmits the second signal with the second strength in a third direction toward the first object based on identifying that the wearable device is turning in the second turning direction, and control the first sensor such that at least one fourth light emitting unit different from the at least one third light emitting unit among the plurality of light emitting units transmits the first signal with in a direction different from the third direction toward the first object.

The first signal transmitted in the direction different from the third direction may form a first sensing range not overlapping with a second sensing range formed by the second signal.

The wearable device may be in a state in which a position of the wearable device is fixed when the wearable device is turning it at least one of the first turning direction and the second turning direction.

According to an aspect of the disclosure, a signal control method of a wearable device may include controlling a first sensor to transmit a first signal with a first strength, identifying a position of a first object, based on a first response signal to the first signal, based on the identified position of the first object, controlling the first sensor to transmit a second signal with a second strength corresponding to a first distance between the wearable device and the first object, detecting, by at least one second sensor, a movement of the wearable device, the movement of the wearable device including at least one of a position change of the wearable device and a direction change of the wearable device, and determining whether to adjust the second strength, based on at least one of the movement of the wearable device and the position of the first object.

The method may further include identifying, by the at least one second sensor, whether the wearable device is moving in a first moving direction, controlling the first sensor to transmit the first signal in a first direction toward the first object based on identifying that the wearable device is moving in the first moving direction, and controlling the first sensor to transmit a third signal corresponding to a second distance between a position of the wearable device and the first object and having a different strength from the first strength.

Controlling of the first sensor to transmit the third signal may be performed based on whether a second response signal to the first signal is received from a second object different from the first object.

The method may further include identifying, by the at least one second sensor, whether the wearable device is moving in a second moving direction opposite to the first moving direction, and controlling the first sensor to transmit a fourth signal corresponding to a third distance between the position of the wearable device and the first object and having a different strength from the first strength based on identifying that the wearable device is moving in the second moving direction.

The method may further include identifying, by the at least one second sensor, whether the wearable device is turning in a first turning direction, controlling the first sensor such that that at least one first light emitting unit of a plurality of light emitting units of the first sensor transmits the second signal in a second direction toward the first object based on identifying that the wearable device is turning in the first turning direction, and controlling the first sensor such that at least one second light emitting unit different from the at least one first light emitting unit among the plurality of light emitting units transmits the first signal in a direction different from the second direction toward the first object.

The method may further include identifying, by the at least one second sensor, whether the wearable device is turning in a second turning direction opposite to the first turning direction, controlling the first sensor such that at least one third light emitting unit of the plurality of light emitting units transmits the second signal in a third direction toward the first object based on identifying that the wearable device is turning in the second turning direction, and controlling the first sensor such that at least one fourth light emitting unit different from the at least one third light emitting unit among the plurality of light emitting units transmits the first signal in a direction different from the third direction toward the first object.

The first signal transmitted in the direction different from the third direction toward the first object may form a first sensing range not overlapping with a second sensing range formed by the second signal.

According to an aspect of the disclosure, an electronic device may include a first sensor, at least one second sensor, and at least one processor configured to control the first sensor to transmit a first signal with a first strength in a first direction, identify a position of a first object in the first direction, based on a response signal to the first signal, based on the identified position of the first object, control the first sensor to transmit a second signal with a second strength corresponding to a first distance between the electronic device and the first object in the first direction, detect, by the at least one second sensor, a movement of the electronic device, the movement of the electronic device including at least one of moving of the electronic device and turning of the electronic device, determine a second distance between the electronic device and the first object, based on detecting the movement of the electronic device, and control the first sensor to transmit a third signal corresponding to the second distance and having a third strength different from the first strength in a second direction toward the first object based on determined second distance being equal to or greater than the first distance.

The at least one processor may be further configured to control the first sensor to transmit the first signal in a third direction different from the second direction.

The at least one processor may be further configured to control the first sensor to transmit the first signal in the second direction based on the determined second distance being less than the first distance.

When the movement of the electronic device is a direction change of the electronic device, the third strength may be the same as the second strength.

The first sensor may include a plurality of light emitting units, and the at least one processor may be further configured to control the first sensor to transmit the third signal in the second direction by at least one first light emitting unit among the plurality of light emitting units, and transmit the first signal in a third direction different from the second direction by at least one second light emitting unit different from the at least one first light emitting unit among the plurality of light emitting units based on the second direction being different from the first direction.

A signal control method and a wearable device supporting the same according to various embodiments may adaptively adjust the strength of a signal for detecting an object, based on a movement of the wearable device, thereby providing a solution for reducing power consumption of the wearable device and increasing available time of the wearable device.

In addition, various effects directly or indirectly identified through the disclosure may be provided.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
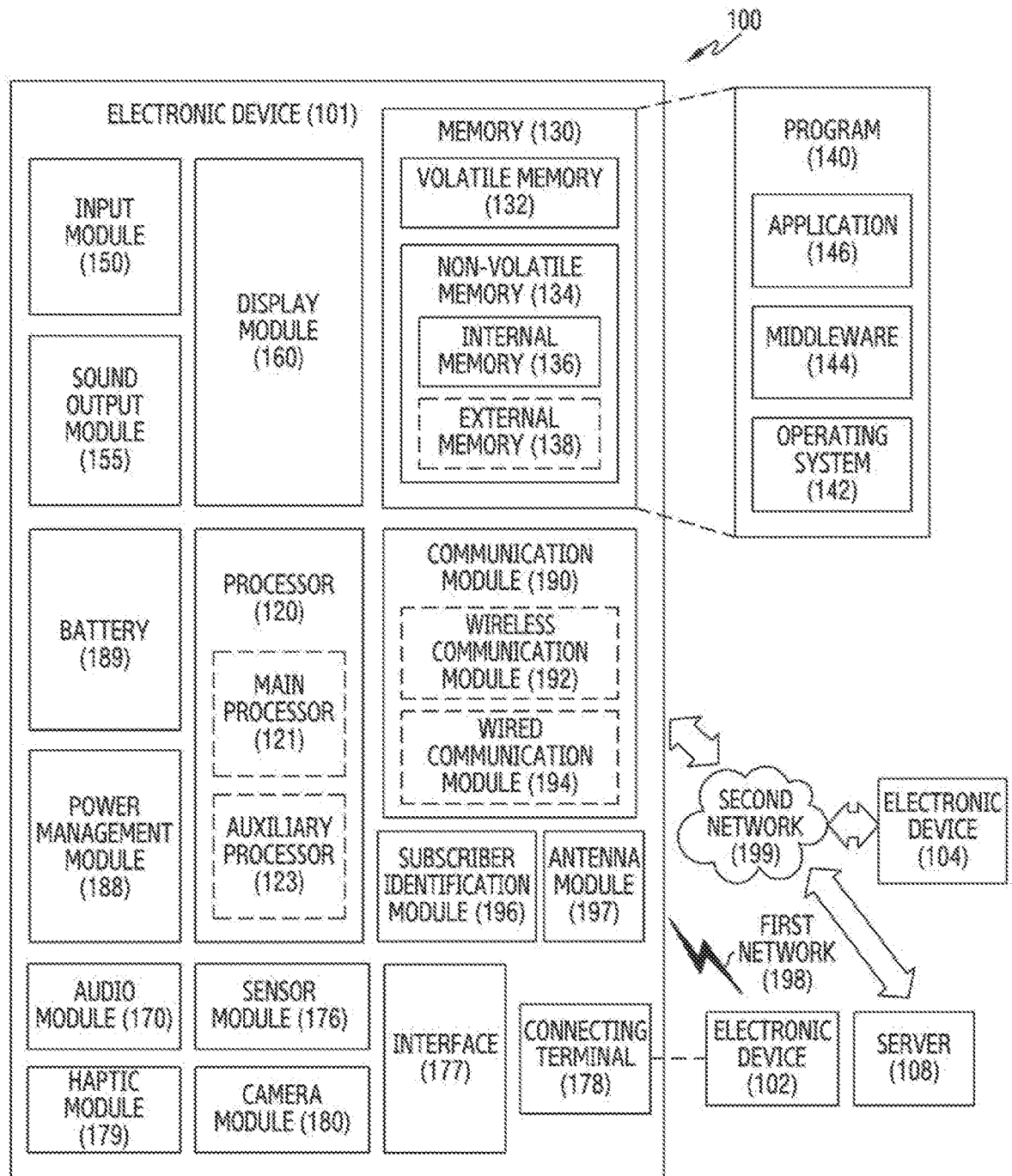
FIG. 1 is a diagram of an electronic device in a network environment according to an embodiment.

Hereinafter, various embodiments will be described with reference to the accompanying drawings. However, this is not intended to limit the specific embodiments, and it should be understood that various modifications, equivalents, and/or alternatives of the embodiments are included.

In describing the drawings, the same reference numerals may be used to refer to the same or corresponding elements.

FIG. 1 is a diagram of an electronic device in a network environment according to an embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Hereinafter, a wearable device mentioned with reference to the drawings may correspond to the electronic device 101 of FIG. 1, or may include at least one of the components of the electronic device 101.

Figure 2:
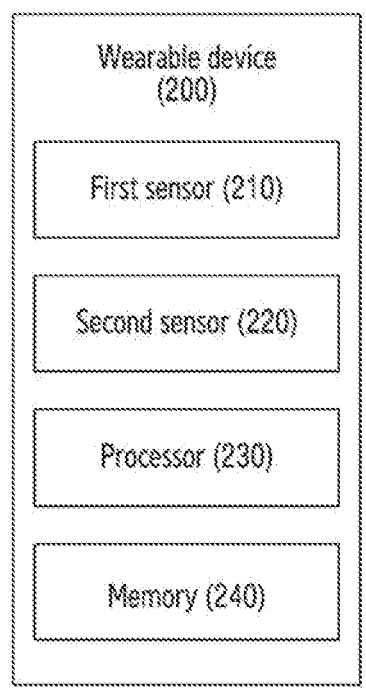
FIG. 2 is a diagram of a component of a wearable device according to an embodiment.

FIG. 2 is a diagram of components of a wearable device according to an embodiment.

Referring to FIG. 2, the wearable device 200 (e.g., the electronic device 101 of FIG. 1) according to an embodiment may include a first sensor 210, at least one second sensor 220, at least one processor 230 (e.g., the processor 120 of FIG. 1), and a memory 240 (e.g., the memory 130 of FIG. 1). In various embodiments, the wearable device 200 may omit at least one of the foregoing components, or may further include at least one other component. For example, the wearable device 200 may further include a camera module (e.g., the camera module 180 of FIG. 1) for obtaining at least one piece of data (e.g., image data) related to an operation of the wearable device 200.

According to an embodiment, the first sensor 210 may transmit a signal for detecting an object, and may receive a response signal (or a reflected signal) to the transmitted signal. For example, the first sensor 210 may transmit a signal with a first strength (e.g., a signal with a maximum strength) capable of covering a specified sensing range toward the front of the wearable device 200 worn on (or attached to) a user's body part, and may receive a response signal reflected from an object disposed within the sensing range.

According to an embodiment, the processor 230 may be configured to control the first sensor 210 and the second sensor 220 to perform various operations. According to an embodiment, the first sensor 210 may adjust the signal with the first strength. For example, after transmitting the signal with the first strength in a first direction, the first sensor 210 may transmit a signal with a strength different from the first strength in the same direction as the first direction, in a direction adjacent to the first direction, and/or in a direction different from the first direction.

According to various embodiments, the first sensor 210 may be a sensor module including a light emitting unit and a light receiving unit to transmit and receive a signal. For example, the first sensor 210 may include at least one of a light detection and ranging (LIDAR) sensor, a HeT camera, or a see-through camera. In various embodiments, the first sensor 210 may include a plurality of light emitting units and a plurality of light receiving units. The plurality of light emitting units may transmit signals for detecting an object in different directions, respectively. The plurality of light receiving units may receive response signals to signals directed in different directions, respectively.

According to various embodiments, the first sensor 210 may include a plurality of device groups. The plurality of device groups may be arranged in a grid form. Each of the plurality of device groups may include at least one transmitter (Tx) device and at least one receiver (Rx) device corresponding to the at least one Tx device. For example, a first device group may include at least one first Tx device and at least one first Rx device, and a second device group different from the first device group may include at least one second Tx device and at least one second Rx device.

According to various embodiments, the first sensor 210 may transmit Tx signals toward the front of the wearable device 200 using Tx devices of the plurality of device groups, and may detect the position of an object, based on a transmission time of the Tx signals and a reception time of Rx signals received through Rx devices of the plurality of device groups by reflection on the object.

According to various embodiments, the Tx devices of the plurality of device groups may transmit signals with different strengths respectively. For example, the at least one first Tx device of the first device group may transmit a signal with the first strength, and the at least one second Tx device of the second device group may transmit a signal with a second strength different from the first strength while the at least one Tx device of the first device group may transmit the signal with the first strength.

According to an embodiment, the at least one second sensor 220 may detect a movement of the wearable device 200. For example, the at least one second sensor 220 may detect the wearable device 200 worn on (or attached to) the user's body part changing a position forward or backward and/or changing a direction by turning to the left or right. The position change and the direction change may be independent of each other, or may be associated with each other. In an embodiment, the at least one second sensor 220 may periodically monitor the foregoing movement of the wearable device 200 while the first sensor 210 transmits a signal and/or receives a response signal to the signal.

According to various embodiments, when detecting a movement of the wearable device 200 while the first sensor 210 transmits a signal and/or receives a response signal to the signal, the at least one second sensor 220 may transmit data corresponding to the detected movement to the at least one processor 230. The data transmitted to the at least one processor 230 may function as a trigger to adjust the strength of a signal transmitted from the first sensor 210.

According to various embodiments, when detecting a movement of the wearable device 200 while the first sensor 210 does not transmit a signal and/or does not receive a response signal to the signal, the at least one second sensor 220 may transmit data corresponding to the detected movement to the at least one processor 230. The data transmitted to the at least one processor 230 may function as a trigger to adjust the strength of a signal to be transmitted from the first sensor 210.

According to various embodiments, the at least one second sensor 220 may be a sensor module that detects at least one of the acceleration, slope, and GPS information of the wearable device 200. For example, the at least one second sensor 220 may include at least one of an inertial measurement unit (IMU) sensor, an acceleration sensor, an angular rate sensor, a geomagnetic sensor, a gyro sensor, and a rotation angle sensor.

According to an embodiment, the at least one processor 230 may be electrically connected to the first sensor 210 and the at least one second sensor 220 to transmit to at least one instruction related to a functional operation of the sensors 210 and 220 to the corresponding sensors. In addition, the at least one processor 230 may perform an operation or processing with respect to an electrical signal or a data value transmitted from the sensors 210 and 220.

According to an embodiment, when detecting a movement of the wearable device 200 using the at least one second sensor 220, the at least one processor 230 may adjust the strength of a signal transmitted from the first sensor 210, at least based on the detected movement. For example, the at least one processor 230 may adaptively adjust the strength of the signal transmitted from the first sensor 210, based on at least one of a position change and a direction change of the wearable device 200 detected using the at least one sensor 220 and the position of an object.

In an embodiment, as an initial operation, the at least one processor 230 may control the first sensor 210 to transmit a signal with the first strength corresponding to the maximum strength toward the front of the wearable device 200. The at least one processor 230 may determine the position of an object (e.g., a first object), based on detecting a response signal to the signal with the first strength transmitted from the first sensor 210. The position of the object may be determined based on a transmission time (TSP) of the signal with the first strength and a reception time (TRR) of the response signal to the signal with the first strength. For example, the at least one processor 230 may calculate a round-trip time (RTT) corresponding to a difference between the transmission time of the signal with the first strength and the reception time of the response signal, and may obtain distance data between the wearable device 200 and the object, based on the RTT. In an embodiment, the at least one processor 230 may store the obtained distance data in the memory 240, and may use the distance data as a reference value when adjusting the strength of the signal transmitted from the first sensor 210.

In an embodiment, the at least one processor 230 may calculate a first distance between the wearable device 200 and the object, based on the obtained distance data between the wearable device 200 and the object, and may control the first sensor 210 to transmit a signal with the second strength (e.g., a strength less than the first strength) corresponding to the first distance. The signal with the second strength may be a signal with a strength capable of reaching the position of the object from the wearable device 200. In an embodiment, to detect a change in the distance between the wearable device 200 and the object, the at least one processor 230 may periodically transmit the signal with the second strength in a direction to the position of the object, and may control the first sensor 210 to receive a response signal resulting from reflection of the signal.

In an embodiment, the at least one processor 230 may detect a movement of the wearable device 200 using the at least one second sensor 220 while controlling the first sensor 210 to transmit the signal with the second strength. The at least one processor 230 may adjust the signal with the second strength transmitted from the first sensor 210, based on the detected movement and the distance data between the wearable device 200 and the object.

In various embodiments, when the detected movement corresponds to a movement of the wearable device 200 worn on the user's body part moving forward, the at least one processor 230 may adjust the signal with the second strength transmitted from the first sensor 210 to a signal with the first strength corresponding to the maximum strength. When another object (e.g., a second object different from the first object) is not detected after adjusting the signal with the second strength to the signal with the first strength, the at least one processor 230 may adjust the signal with the second strength transmitted from the first sensor 210, based on a moving distance determined according to the wearable device 200 moving forward and the distance data. For example, the at least one processor 230 may calculate a second distance by subtracting a distance value of the moving distance determined according to the wearable device 200 moving forward from a distance value of the obtained distance data, and may control the first sensor 210 to transmit a signal with a third strength (e.g., a strength less than the second strength) corresponding to the second distance.

In various embodiments, when the detected movement corresponds to a movement of the wearable device 200 worn on the user's body part moving forward, the at least one processor 230 may at least partly adjust the signal with the second strength transmitted from the first sensor 210 according to a direction. For example, the at least one processor 230 may control the first sensor 210 to transmit the signal with the third strength based on the moving distance determined according to the wearable device 200 moving forward and the distance data in a direction in which the object is present and to transmit the signal with the first strength corresponding to the maximum strength in a different direction.

In various embodiments, when the detected movement corresponds to a movement of the wearable device 200 worn on the user's body part moving backward, the at least one processor 230 may adjust the signal with the second strength transmitted from the first sensor 210, based on a moving distance determined according to the wearable device 200 moving backward and the distance data. For example, the at least one processor 230 may calculate a third distance by adding a distance value of the moving distance determined according to the wearable device 200 moving backward to the distance value of the obtained distance data, and may control the first sensor 210 to transmit a signal with a fourth strength (e.g., a strength greater than the second strength) corresponding to the third distance.

In various embodiments, when the detected movement corresponds to a turning (right turn or left turn) movement of the wearable device 200 worn on the user's body part, the at least one processor 230 may at least partly adjust the signal with the second strength transmitted from the first sensor 210 according to the sensing range, based on a direction determined according to a turn of the wearable device 200 and the obtained distance data. For example, the at least one processor 230 may control at least one light emitting unit of the plurality of light emitting units of the first sensor 210 to transmit a signal with the second strength in a direction toward the object. In addition, while controlling the at least one light emitting unit, the at least one processor 230 may control at least one different light emitting unit of the plurality of light emitting units to transmit a signal with the first strength in a direction different from the direction toward the object. The at least one light emitting unit and the at least one different light emitting unit may transmit signals with different strengths for substantially the same time.

In various embodiments, the processor 230 may determine the distance between the wearable device 200 and the object, based on detecting the movement of the wearable device 200. The processor 230 may adjust the strength (e.g., the second strength) of the signal transmitted from the first sensor 210, based on the determined distance. For example, when the determined distance is greater than the distance between the wearable device 200 and the object before the movement of the wearable device 200 is detected, the processor 230 may control the first sensor 210 to transmit a signal based on the determined distance and having a strength (e.g., a strength greater than the second strength) different from the strength of the transmitted signal in a direction toward the first object. In another example, when the determined distance is equal to the distance between the wearable device 200 and the object before the movement of the wearable device 200 is detected, the processor 230 may control the first sensor 210 to transmit a signal having the same strength (e.g., the second strength) as the strength of the transmitted signal in the direction toward the first object. In still another example, when the determined distance is less than the distance between the wearable device 200 and the object before the movement of the wearable device 200 is detected, the processor 230 may control the first sensor 210 to transmit a signal based on the determined distance and having a strength (e.g., a strength less than the second strength) different from the strength of the transmitted signal in the direction toward the object.

Figure 3:
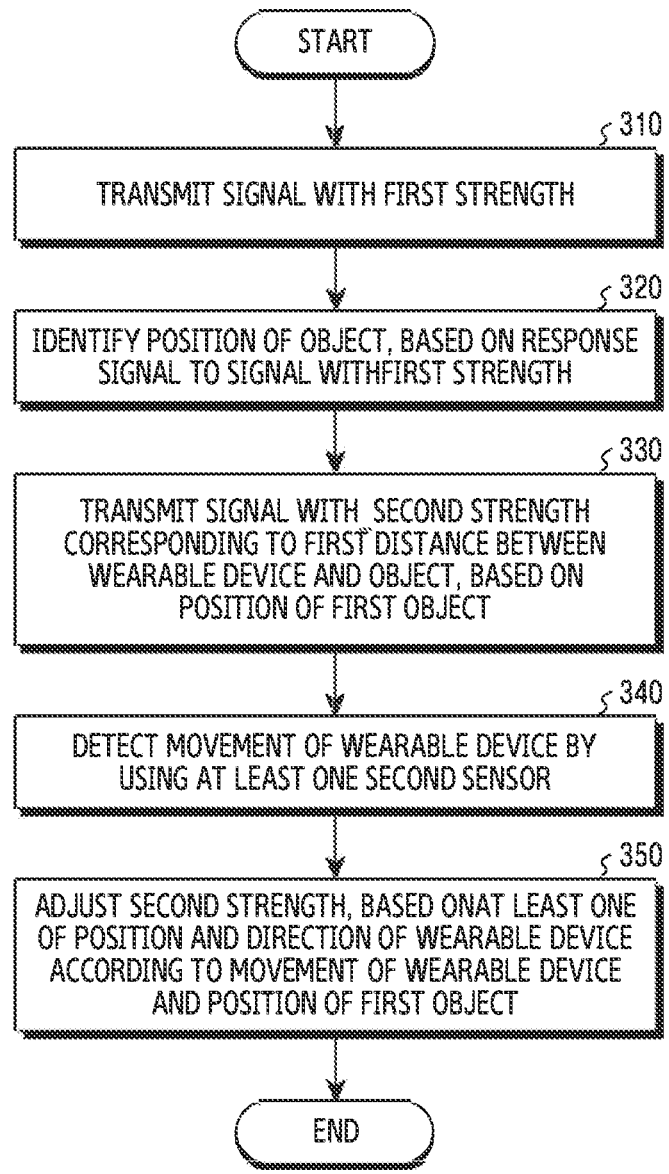
FIG. 3 is a flowchart of a signal control method of a wearable device according to an embodiment.

FIG. 3 is a flowchart of a signal control method of a wearable device according to an embodiment.

Referring to FIG. 3, the wearable device 200 according to an embodiment may perform operation 310 to operation 350 as the signal control method.

Referring to operation 310, the wearable device 200 may transmit a signal with a first strength corresponding to a maximum strength. For example, at least one processor 230 may control a first sensor 210 to transmit a signal with a first strength to the front of the wearable device 200.

Referring to operation 320, the wearable device 200 may detect the position of an object, based on a response signal to the signal with the first strength reflected from the object disposed in front of the wearable device 200. For example, the at least one processor 230 may calculate an RTT corresponding to a difference between a transmission time (TSP) of the signal with the first strength and a reception time (TRR) of the response signal, and may identify the position of the object by obtaining distance data between the wearable device 200 and the object, based on the RTT.

Referring to operation 330, the wearable device 200 may transmit a signal with a second strength (e.g., a strength less than the first strength) corresponding to a first distance between the wearable device 200 and the object, based on the position of the object. For example, the at least one processor 230 may control the first sensor 210 to transmit a signal with the second strength based on the first distance between the wearable device 200 and the object, based on the distance data between the wearable device 200 and the object obtained in operation 320.

Referring to operation 340, the wearable device 200 may detect a movement of the wearable device 200 worn on a user's body part using at least one second sensor 220. For example, the at least one processor 230 may detect the wearable device 200 changing a position forward or backward and/or changing a direction by turning to the left or right using the at least one second sensor 220 while controlling the first sensor 210 to transmit the signal with the second strength.

Referring to operation 350, the wearable device 200 may adjust the strength of the signal transmitted from the first sensor 210, based on at least one of a position change and a direction change of the wearable device 200 determined according to the movement and the distance data between the wearable device 200 and the object obtained in operation 320. For example, the at least one processor 230 may add a value of a moving distance determined according to the wearable device 200 moving forward or moving backward to a distance value of the distance data or may subtract the value of the moving distance from the distance value of the distance data, thereby controlling the first sensor 210 to transmit a signal with a strength corresponding to a distance different from the distance value of the distance data. In another example, the at least one processor 230 may control the first sensor 210 to transmit a signal with a strength at least partly corresponding to the distance value of the distance data corresponding to a turning movement of the wearable device 200.

Figure 4:
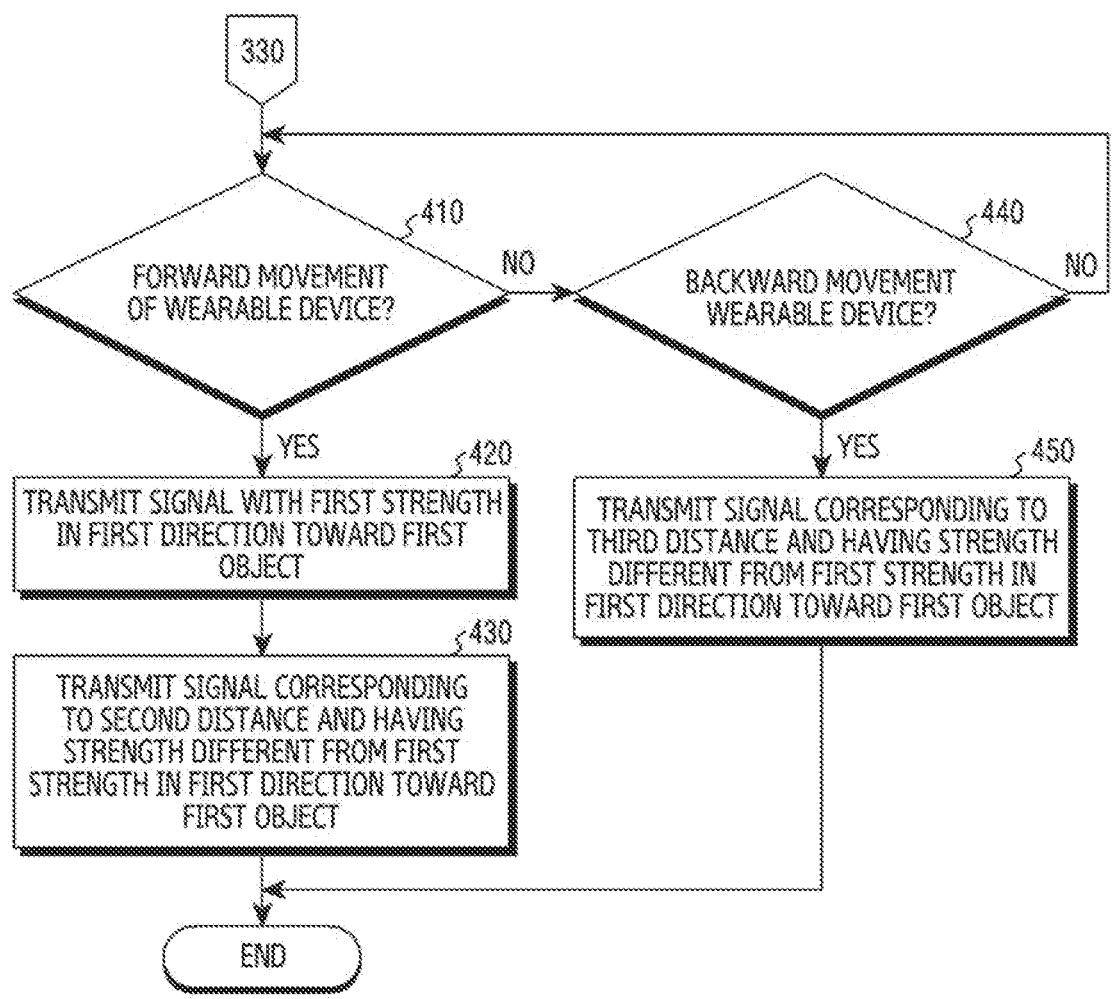
FIG. 4 is a flowchart of a signal control method of a wearable device after a position change according to an embodiment.

FIG. 4 is a flowchart of a signal control method of a wearable device after a position change according to an embodiment.

Referring to FIG. 4, the wearable device 200 according to an embodiment may perform operation 410 to operation 450 as the signal control method after the position change. In various embodiments, operation 410 to operation 450 may be operations performed after operation 330 illustrated in FIG. 3.

Referring to operation 410, the wearable device 200 may determine whether a movement of the wearable device 200 worn on the user's body part corresponds to a forward movement. For example, the at least one processor 230 may identify whether a first movement of the wearable device moving in a first moving direction (e.g., a +x direction of FIG. 5A) is detected using the at least one second sensor 220.

Referring to operation 420, the wearable device 200 may transmit a signal with a first strength corresponding to a maximum strength in a first direction toward an object, based on identifying that the movement of the wearable device 200 corresponds to a forward movement. For example, the at least one processor 230 may adjust a signal with a second strength transmitted from the first sensor 210 to the signal with the first strength corresponding to the maximum strength, and may control the first sensor 210 to transmit the adjusted signal with the first strength. In various embodiments, operation 420 may be omitted.

Referring to operation 430, the wearable device 200 may transmit a signal corresponding to a second distance and having a strength different from the first strength in the first direction toward the first object. When no other object is detected after transmitting the signal with the first strength adjusted from the signal with the second strength, the at least one processor 230 may adjust the signal with the second strength transmitted from the first sensor 210, based on a moving distance determined according to the wearable device 200 moving forward and previously obtained distance data (e.g., first distance data between the wearable device 200 and the object before the movement of the wearable device 200 is detected). For example, the at least one processor 230 may control the first sensor 210 to transmit a signal with a third strength (e.g., a strength less than the second strength) corresponding to a second distance obtained by subtracting a distance value of the moving distance determined according to the wearable device 200 moving forward from a distance value of the obtained distance data.

Referring to operation 440, the wearable device 200 may determine whether the movement of the wearable device 200 worn on the user's body part corresponds to a backward movement. For example, the at least one processor 230 may identify whether a second movement of the wearable device moving in a second moving direction (e.g., a −x direction of FIG. 5A) is detected using at least one second sensor 220.

Referring to operation 450, when the movement of the wearable device 200 is identified as a backward movement, the wearable device 200 may adjust the signal with the second strength transmitted from the first sensor 210, based on a moving distance determined according to the wearable device 200 moving backward and the obtained distance data. For example, the at least one processor may control the first sensor 210 to transmit a signal with a fourth strength (e.g., a strength greater than the second strength) corresponding to a third distance obtained by adding a distance value of the moving distance determined according to the wearable device 200 moving backward to the distance value of the obtained distance data.

Figure 5A:
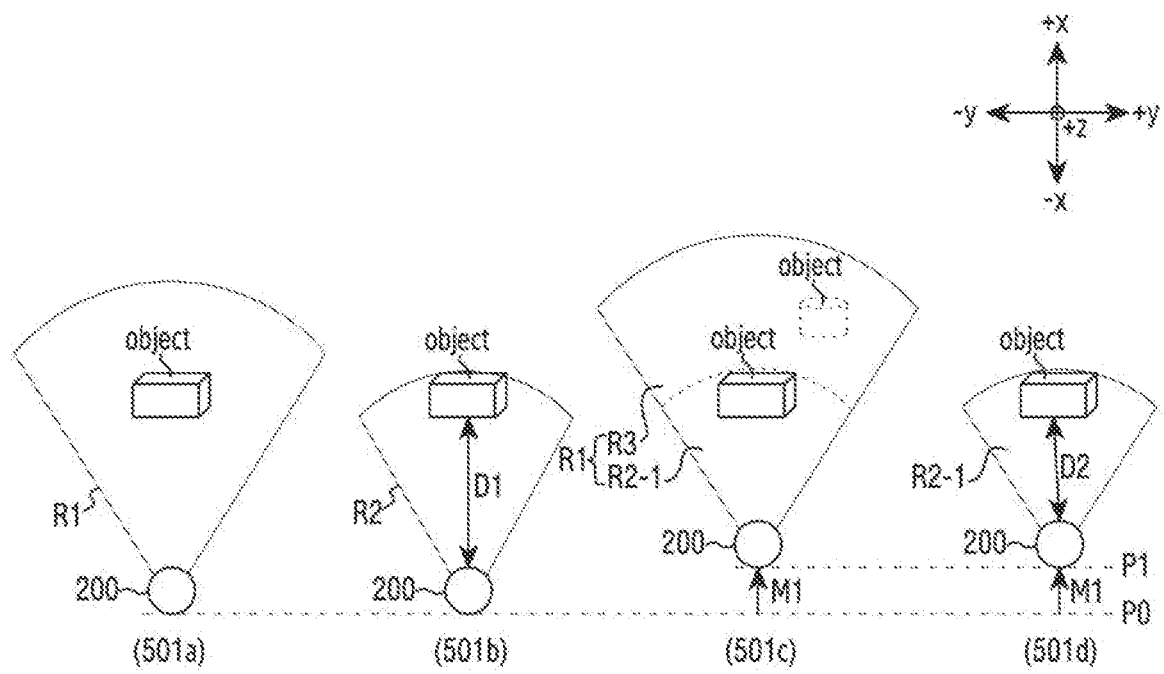
FIG. 5A is a diagram of a sensing range of a wearable device after a position change in a forward direction according to an embodiment.

FIG. 5A is a diagram of a sensing range of a wearable device after a position change in a forward direction according to an embodiment.

Referring to FIG. 5A, the wearable device 200 according to an embodiment may transmit signals with different strengths for detecting an object based on a first state 501*a*, a second state 501*b*, a third state 501*c*, or a fourth state 501*d*.

Referring to the first state 501*a*, the wearable device 200 may transmit a signal with a first strength corresponding to a maximum strength toward the front of the wearable device 200. For example, as an initial operation for detecting the position of an object, at least one processor 230 may control a first sensor 210 to transmit the signal with the first strength. The signal with the first strength may form a first sensing range R1 (e.g., a maximum sensing range).

Referring to the second state 501*b*, when an object is detected, the wearable device 200 may transmit a signal with the second strength corresponding to a first distance D1 (e.g., 4 m) between the wearable device 200 and the object in a first direction (e.g., a +x direction) toward the object. For example, when obtaining distance data between the wearable device 200 and the object, based on detecting a response signal (e.g., the signal with the first strength reflected from the object) to the signal with the first strength transmitted from a first sensor 210, the at least one processor 230 may control the first sensor 210 to transmit the signal with the second strength corresponding to the first distance D1, which is a distance value of the obtained distance data. The signal with the second strength may form a second sensing range R2 (e.g., a sensing range smaller than the maximum sensing range). The obtained distance data may be stored in a memory 240 of the wearable device 200.

Referring to the third state 501*c*, the wearable device 200 may adjust the signal with the second strength transmitted in the second state 501*b* to the signal with the first strength corresponding to the maximum strength, based on detecting a first movement M1 of the wearable device 200. The first movement M1 may be a movement of the wearable device 200 moving forward from a first point P0 to a second point P1 (e.g., a point 1 m away from the first point P0). The adjusted signal with the first strength may form the first sensing range R1. In various embodiments, the first sensing range R1 may include a sensing range R2-1 partially overlapping with the second sensing range R2 in the second state 501*b* and a sensing range R3 not overlapping with the second sensing range R2. The wearable device 200 may additionally identify whether another object exists in the overlapping sensing range R2-1 and the non-overlapping sensing range R3. In various embodiments, an operation of adjusting the signal with the second strength to the signal with the first strength in the third state 501*c* may be for detecting whether a new object exists in the sensing range (e.g., R3) not overlapping with the existing sensing range (e.g., R2) according to the first movement of the wearable device 200. In various embodiments, the operation in the third state 501c may be omitted.

Referring to the fourth state 501d, the wearable device 200 may transmit a signal with a third strength corresponding to a second distance D2 (e.g., 3 m) between the wearable device 200 and the object in the first direction (e.g., the +x direction) toward the object, based on identifying that there is no other object in the third state 501c. For example, the at least one processor 230 may control the first sensor 210 to transmit the signal with the third strength corresponding to the second distance D2 (e.g., 3 m) obtained by subtracting a distance value (e.g., 1 m) of a moving distance determined according to the first movement M1 from the distance value (e.g., 4 m) of the obtained distance data. The signal with the third strength may form the sensing range R2-1 overlapping with the second sensing range R2 in the second state 501b.

Figure 5B:
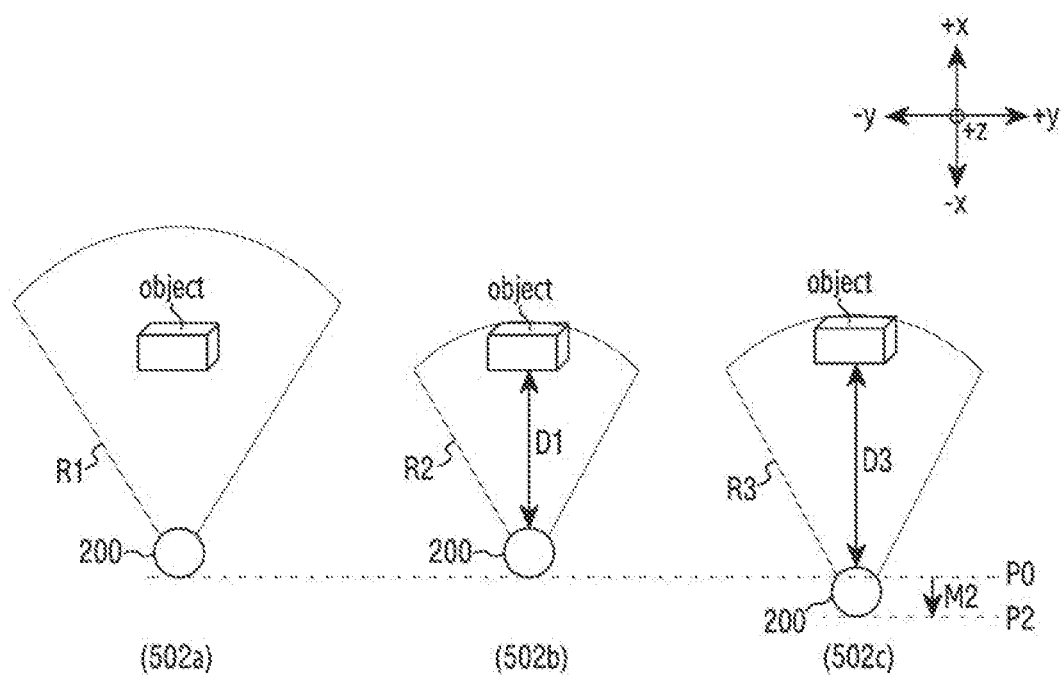
FIG. 5B is a diagram of a sensing range of a wearable device after a position change in a backward direction according to an embodiment.

FIG. 5B is a diagram of a sensing range of a wearable device after a position change in a backward direction according to an embodiment.

Referring to FIG. 5B, the wearable device 200 according to an embodiment may transmit signals with different strengths for detecting an object based on a first state 502a, a second state 502b, or a third state 502c.

Referring to the first state 502a, the wearable device 200 may transmit a signal with a first strength corresponding to a maximum strength toward the front of the wearable device 200. For example, as an initial operation for detecting the position of an object, at least one processor 230 may control a first sensor 210 to transmit the signal with the first strength. The signal with the first strength may form a first sensing range R1 (e.g., a maximum sensing range).

Referring to the second state 502b, when an object is detected, the wearable device 200 may transmit a signal with the second strength corresponding to a first distance D1 (e.g., 4 m) between the wearable device 200 and the object in a first direction (e.g., a +x direction) toward the object. For example, when obtaining distance data between the wearable device 200 and the object, based on detecting a response signal to the signal with the first strength transmitted from a first sensor 210, the at least one processor 230 may control the first sensor 210 to transmit the signal with the second strength corresponding to the first distance D1, which is a distance value of the obtained distance data. The signal with the second strength may form a second sensing range R2 (e.g., a sensing range smaller than the maximum sensing range). The obtained distance data may be stored in a memory 240 of the wearable device 200.

Referring to the third state 502c, the wearable device 200 may transmit a signal with a third strength corresponding to a third distance D3 (e.g., 5 m) between the wearable device 200 and the object in the first direction (e.g., a +x direction) toward the object, based on detecting a second movement M2 of the wearable device 200. For example, the at least one processor 230 may control the first sensor 210 to transmit the signal with the third strength corresponding to the third distance D3 (e.g., 5 m) obtained by adding a distance value (e.g., 1 m) of a moving distance corresponding to the second movement M2 to the distance value (e.g., 4 m) of the obtained distance data. The second movement M2 may be a movement of moving backward from a first point P0 to a third point P2 (e.g., a point 1 m away from the first point P0). The signal with the third strength may form a third sensing range R3. The third sensing range R3 may partially overlap with the second sensing range R2 in the second state 502b.

Figure 6:
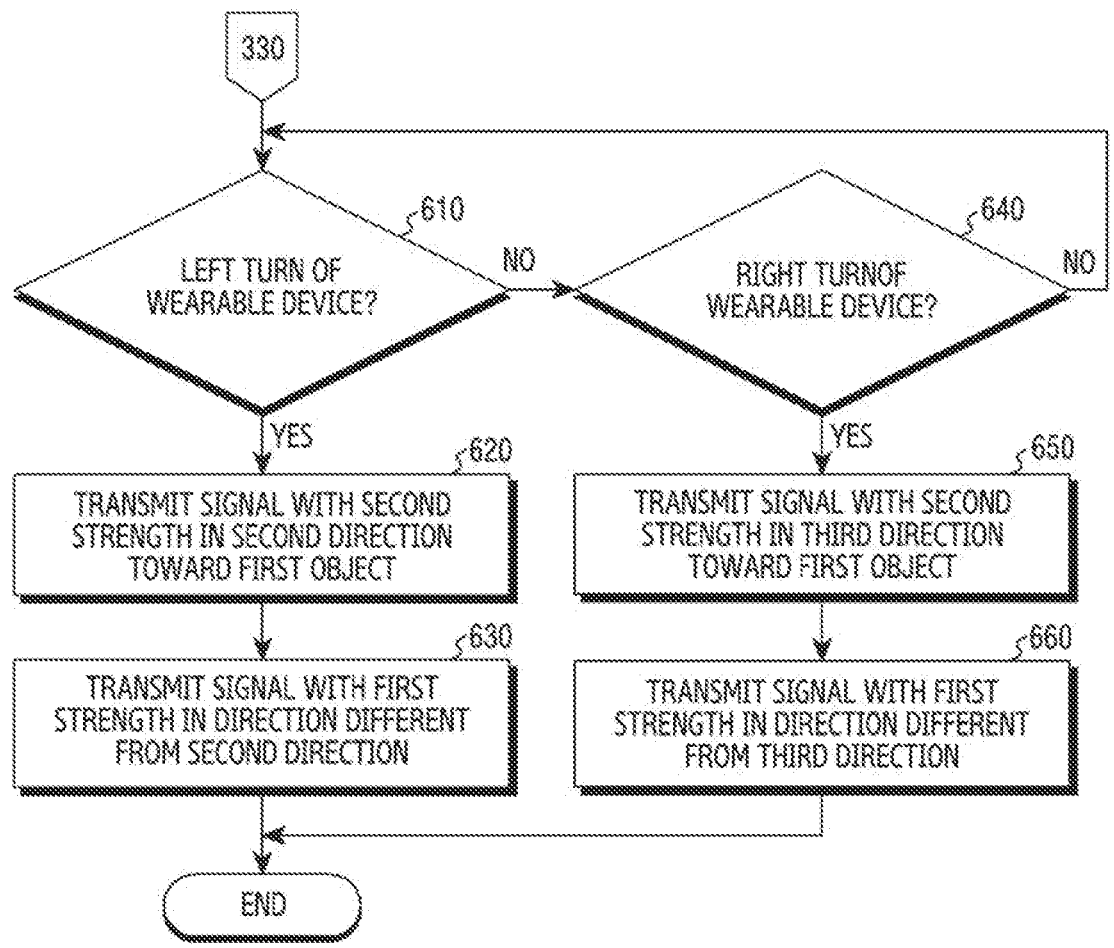
FIG. 6 is a flowchart of a signal control method of a wearable device after a direction change according to an embodiment.

FIG. 6 is a flowchart of a signal control method of a wearable device after a direction change according to an embodiment.

Referring to FIG. 6, the wearable device 200 according to an embodiment may perform operation 610 to operation 660 as the signal control method after direction change. In various embodiments, operation 610 to operation 660 may be operations performed after operation 330 illustrated in FIG. 3.

Referring to operation 610, the wearable device 200 may determine whether a movement of the wearable device 200 worn on the user's body part corresponds to a left turning movement. For example, the at least one processor 230 may identify whether a third movement of the wearable device 200 turning in a first turning direction (e.g., a direction between +x and −y of FIG. 7A) is detected using the at least one second sensor 220.

Referring to operation 620, the wearable device 200 may at least partially adjust a signal with a second strength transmitted from the first sensor 210, based on identifying that the movement of the wearable device 200 corresponds to the left turning movement. For example, the at least one processor 230 may control the first sensor 210 to transmit the signal with the second strength in a second direction toward the object corresponding to the turning direction of the wearable device 200.

Referring to operation 630, the wearable device 200 may at least partially adjust the signal with the second strength transmitted from the first sensor 210, based on identifying that the movement of the wearable device 200 corresponds to the left turning movement. For example, while performing operation 620, the at least one processor 230 may control the first sensor 210 to transmit a signal with a first strength corresponding to a maximum strength in a direction different from the second direction toward the object corresponding to the turning direction of the wearable device 200. Operation 630 may be performed substantially simultaneously with operation 620, or may be performed before operation 620.

Referring to operation 640, the wearable device 200 may determine whether the movement of the wearable device 200 corresponds to a right turning movement. For example, the at least one processor 230 may identify whether a fourth movement of the wearable device 200 turning in a second turning direction (e.g., a direction between +x and +y of FIG. 7B) is detected using the at least one second sensor 220.

Referring to operation 650, the wearable device 200 may at least partially adjust the signal with the second strength transmitted from the first sensor 210, based on identifying that the movement of the wearable device 200 corresponds to the right turning movement. For example, the at least one processor 230 may control the first sensor 210 to transmit the signal with the second strength in a third direction toward the object based on the turning direction of the wearable device 200.

Referring to operation 660, the wearable device 200 may at least partially adjust the signal with the second strength transmitted from the first sensor 210, based on identifying that the movement of the wearable device 200 corresponds to the right turning movement. For example, while performing operation 650, the at least one processor 230 may control the first sensor 210 to transmit the signal with the first strength corresponding to the maximum strength in a direction different from the third direction toward the object based on the turning direction of the wearable device 200. Operation 660 may be performed substantially simultaneously with operation 650, or may be performed before operation 650.

Figure 7A:
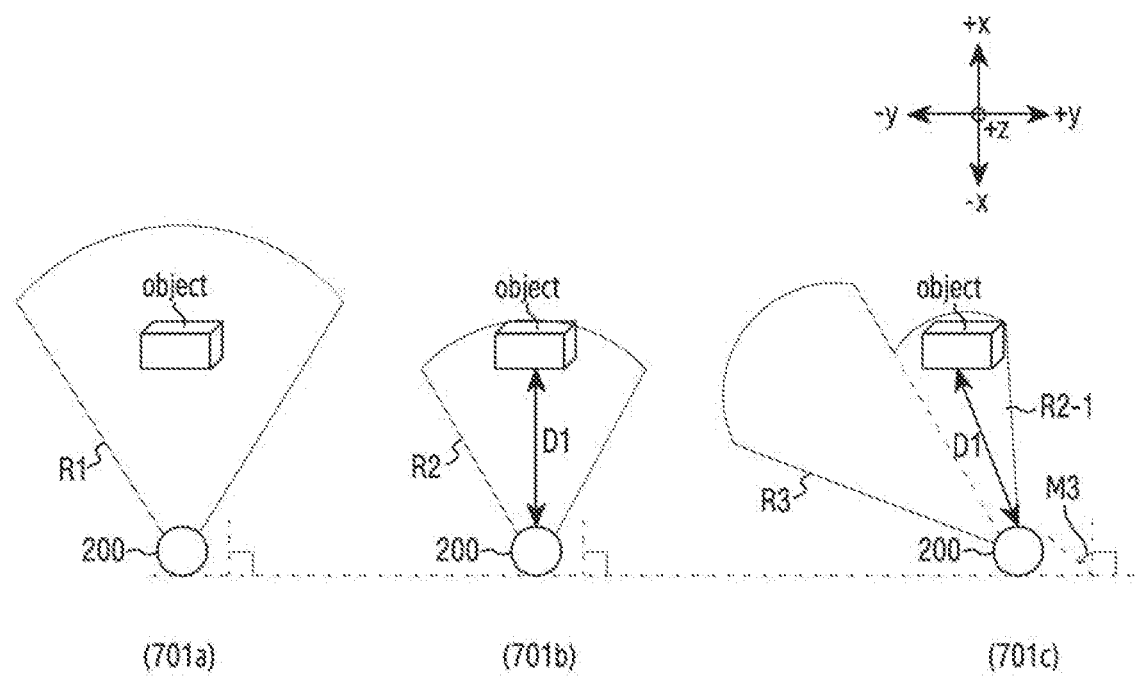
FIG. 7A is a diagram of a sensing range of a wearable device after a direction change in a left direction according to an embodiment.

FIG. 7A is a diagram of a sensing range of a wearable device after a direction change in a left direction according to an embodiment.

Referring to FIG. 7A, the wearable device 200 according to an embodiment may transmit signals with different strengths for detecting an object based on a first state 701a, a second state 701b, or a third state 701c.

Referring to the first state 701a, the wearable device 200 may transmit a signal with a first strength corresponding to a maximum strength toward the front of the wearable device 200. For example, as an initial operation for detecting the position of an object, at least one processor 230 may control a first sensor 210 to transmit the signal with the first strength. The signal with the first strength may form a first sensing range R1 (e.g., a maximum sensing range).

Referring to the second state 701b, when an object is detected, the wearable device 200 may transmit a signal with the second strength corresponding to a first distance D1 (e.g., 4 m) between the wearable device 200 and the object in a first direction (e.g., a +x direction) toward the object. For example, when obtaining distance data between the wearable device 200 and the object, based on detecting a response signal to the signal with the first strength transmitted from a first sensor 210, the at least one processor 230 may control the first sensor 210 to transmit the signal with the second strength corresponding to the first distance D1, which is a distance value of the obtained distance data. The signal with the second strength may form a second sensing range R2 (e.g., a sensing range smaller than the maximum sensing range). The obtained distance data may be stored in a memory 240 of the wearable device 200.

Referring to the third state 701c, the wearable device 200 may at least partially adjust the signal with the second strength, based on detecting a third movement M3 corresponding to a left turn of the wearable device 200, thereby transmitting signals with different strengths in different directions, respectively. For example, based on the third movement M3 of the wearable device 200, the at least one processor 230 may control the first sensor 210 to transmit the signal with the second strength in a second direction (e.g., a direction between +x and −y) toward the object, and may control the first sensor 210 to transmit the signal with the first strength in a direction different from the second direction. Here, the signal with the second strength toward the second direction may form a sensing range R2-1 partially overlapping with the second sensing range R2 in the second state 701b, and the signal with the first strength toward the direction different from the second direction may form a sensing range R3 not overlapping with the second sensing range R2.

Figure 7B:
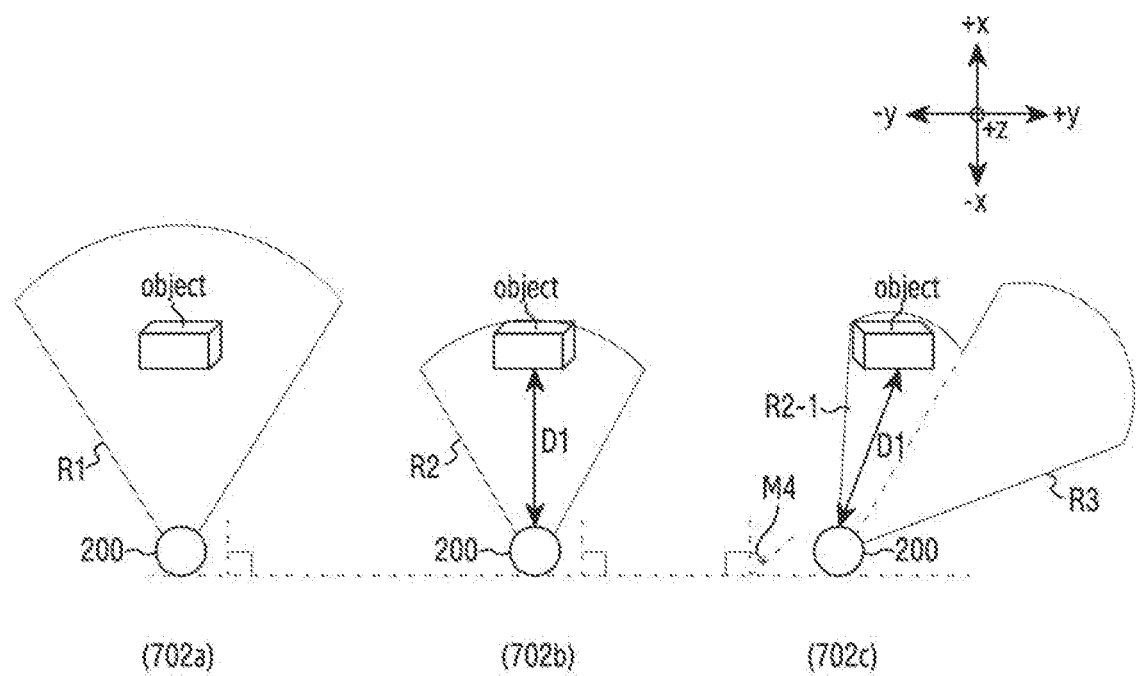
FIG. 7B is a diagram of a sensing range of a wearable device after a direction change in a right direction according to an embodiment.

FIG. 7B is a diagram of a sensing range of a wearable device after a direction change in a right direction according to an embodiment.

Referring to FIG. 7B, the wearable device 200 according to an embodiment may transmit signals with different strengths for detecting an object based on a first state 702a, a second state 702b, or a third state 702c.

Referring to the first state 702a, the wearable device 200 may transmit a signal with a first strength corresponding to a maximum strength toward the front of the wearable device 200. For example, as an initial operation for detecting the position of an object, at least one processor 230 may control a first sensor 210 to transmit the signal with the first strength. The signal with the first strength may form a first sensing range R1 (e.g., a maximum sensing range).

Referring to the second state 702b, when an object is detected, the wearable device 200 may transmit a signal with the second strength corresponding to a first distance D1 (e.g., 4 m) between the wearable device 200 and the object in a first direction (e.g., a +x direction) toward the object. For example, when obtaining distance data between the wearable device 200 and the object, based on detecting a response signal to the signal with the first strength transmitted from a first sensor 210, the at least one processor 230 may control the first sensor 210 to transmit the signal with the second strength corresponding to the first distance D1, which is a distance value of the obtained distance data. The signal with the second strength may form a second sensing range R2 (e.g., a sensing range smaller than the maximum sensing range). The obtained distance data may be stored in a memory 240 of the wearable device 200.

Referring to the third state 702c, the wearable device 200 may partially adjust the signal with the second strength, based on detecting a fourth movement M4 corresponding to a right turn of the wearable device 200, thereby transmitting signals with different strengths in different directions, respectively. For example, based on the fourth movement M4 of the wearable device 200, the at least one processor 230 may control the first sensor 210 to transmit the signal with the second strength in a third direction (e.g., a direction between +x and +y) toward the object, and may control the first sensor 210 to transmit the signal with the first strength in a direction different from the third direction. Here, the signal with the second strength toward the third direction may form a sensing range R2-1 partially overlapping with the second sensing range R2 in the second state 702b, and the signal with the first strength toward the direction different from the third direction may form a sensing range R3 not overlapping with the second sensing range R2.

Figure 7C:
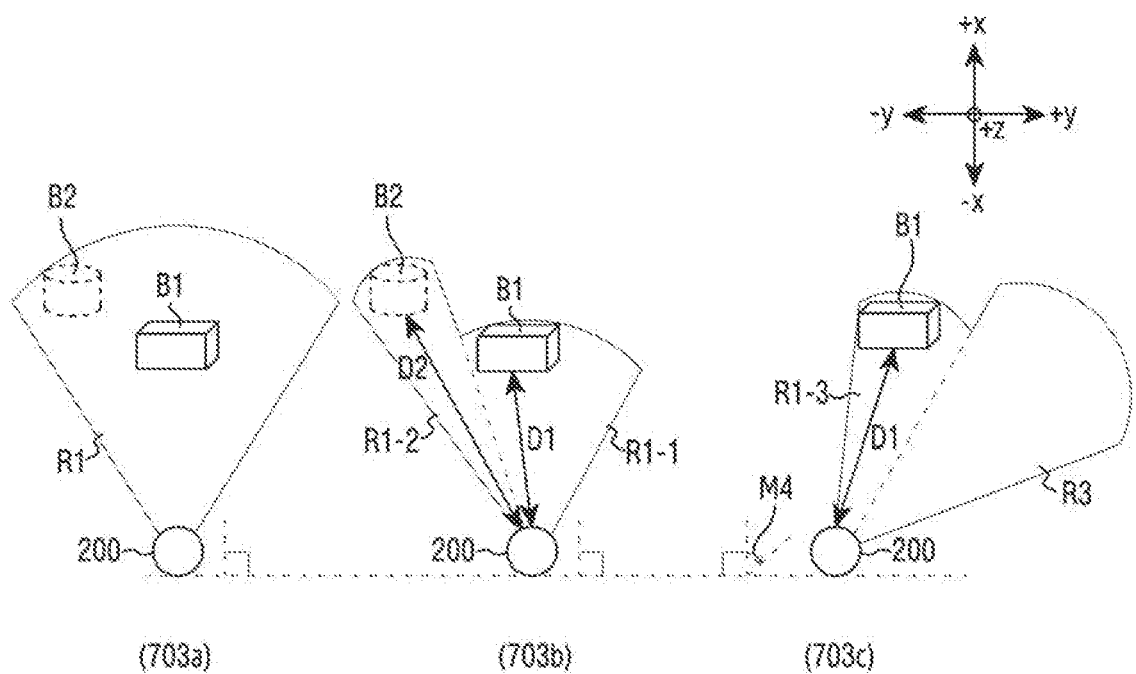
FIG. 7C is a diagram of a sensing range of a wearable device corresponding to each of a plurality of objects according to an embodiment.

FIG. 7C is a diagram of a sensing range of a wearable device corresponding to each of a plurality of objects according to an embodiment.

Referring to FIG. 7C, the wearable device 200 according to an embodiment may transmit signals with different strengths for detecting at least one object based on a first state 703a, a second state 703b, or a third state 703c.

Referring to the first state 703a, the wearable device 200 may transmit a signal with a first strength corresponding to a maximum strength toward the front of the wearable device 200. For example, as an initial operation for detecting the position of at least one object, at least one processor 230 may control a first sensor 210 to transmit the signal with the first strength. The signal with the first strength may form a first sensing range R1 (e.g., a maximum sensing range).

Referring to the second state 703b, when a plurality of objects is detected, the wearable device 200 may transmit signals with different strengths respectively to the plurality of objects, based on a distance between the wearable device 200 and the plurality of objects. For example, the wearable device 200 may transmit a signal with a second strength corresponding to a first distance D1 (e.g., 4 m) between the wearable device 200 and a first object B1 in a direction (e.g., a +x direction) toward the first object B1, and may transmit a signal with a third strength (e.g., a strength greater than the second strength) corresponding to a second distance D2 (e.g., 5 m) between the wearable device 200 and a second object B2 in a direction (e.g., a direction between +x and −y) toward the second object B2.

The signal with the second strength corresponding to the first distance D1 may form a first overlapping sensing range R1-1 that is smaller than the first sensing range R1 in the first state 703a and partially overlaps with the first sensing range R1. The signal with the third strength corresponding to the second distance D2 may form a second overlapping sensing range R1-2 that is smaller than the first sensing range R1 and partially overlaps with the first sensing range R1 in a range different from the first overlapping sensing range R1-1.

Referring to the third state 703c, the wearable device 200 may partially adjust the signal with the second strength, based on detecting a fourth movement M4 corresponding to a right turn of the wearable device 200, thereby transmitting signals with different strengths in different directions, respectively. For example, when the second object B2 is not included in the sensing range resulting from the fourth movement M4 of the wearable device 200, the at least one processor 230 may control the first sensor 210 to continuously transmit the signal with the second strength corresponding to the first distance D1 in a direction (e.g., a direction between +x and +y) toward the first object B1, and may not transmit a signal in the direction (e.g., the direction between +x and −y) toward the second object B2. Further, while controlling the first sensor 210 to continuously transmit the signal with the second strength corresponding to the first distance D1 in the direction (e.g., the direction between +x and +y) toward the first object B1, the at least one processor 230 may control the first sensor 210 to transmit the signal with the first strength in a direction (e.g., the direction between a +x-axis and a +y-axis) different from the direction toward the first object B1.

The signal with the second strength toward the first object B1 may form a sensing range R1-3 partially overlapping with the first overlapping sensing range R1-1 in the second state 703b. The signal with the first strength toward the direction different from the direction toward the first object B1 may form a sensing range R3 not overlapping with the first overlapping sensing range R1-1 and the second overlapping sensing range R1-2 in the second state 703b.

Although the strength of signals has been described as being adjustable corresponding to the position of each of the plurality of objects with reference to FIG. 7C, the movement of the wearable device 200 is not limited to the fourth movement M4 illustrated in FIG. 7C. For example, when one object (e.g., the second object B2) is not included in the first sensing range R1 corresponding to the second movement M2 illustrated in FIG. 5B while transmitting signals with different strengths respectively to the plurality of objects B1 and B2, the wearable device 200 may adaptively adjust the strength of the signals in view of the position of a remaining object (e.g., the first object B1).

Figure 8:
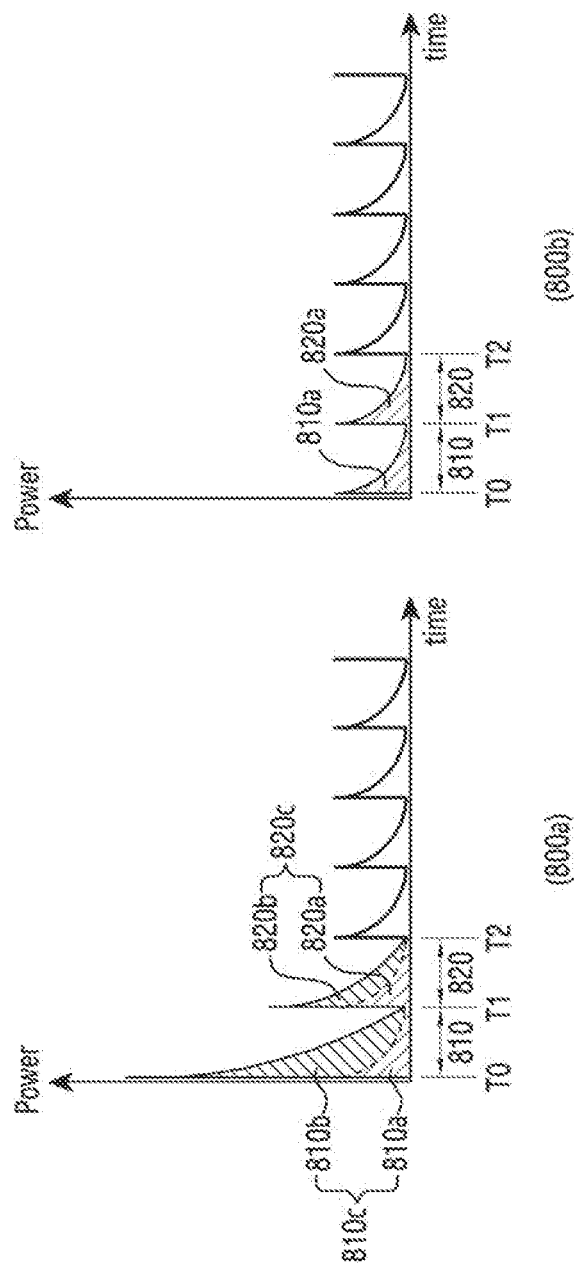
FIG. 8 is a diagram of a power consumption level when the strength of a signal is adjusted based on a movement of a wearable device according to an embodiment.

FIG. 8 is a diagram of a power consumption level when the strength of a signal is adjusted based on a movement of a wearable device according to an embodiment.

Referring to FIG. 8, power consumption may occur as shown in a first graph 800a when a signal control method of the wearable device 200 according to various embodiments is not applied, while power consumption may occur as shown in a second graph 800b when the signal control method of the wearable device 200 according to various embodiments is applied.

Referring to the first graph 800a, when a movement of the wearable device 200 worn on a user's body part is detected, the wearable device 200 may transmit a signal with a first strength 810c, and may then gradually transmit a signal with a strength 820c less than the first strength 810c. For example, after transmitting a signal with a strength corresponding to a first distance between the wearable device 200 and an object, when detecting a movement of the wearable device 200 at a first time T0, at least one processor 230 may control a first sensor 210 to transmit a signal with the first strength 810c corresponding to a maximum strength during a first period 810 between the first time T0 and a second time T1. Further, after transmitting the signal with the first strength 810c, the at least one processor 230 may gradually transmit a signal with a strength 820c less than the first strength 810c during a second period 820 between the second time T1 and a third time T2 regardless of the distance between the wearable device 200 and the object, thereby retrieving the position of the object (or another object).

Referring to the second graph 800b, when the movement of the wearable device 200 worn on the user's body part is detected, the wearable device 200 may transmit a signal with a third strength 810a and a signal with a fourth strength 820a based on the signal with the third strength 810a. For example, after transmitting the signal with the strength corresponding to the first distance between the wearable device 200 and an object, when detecting the movement of the wearable device 200 at the first time T0, the at least one processor 230 may control the first sensor 210 to transmit a signal with the third strength 810a based on the movement and the first distance during the first period 810 between the first time T0 and the second time T1. Further, after transmitting the signal with the third strength 810a, the at least one processor 230 may continuously transmit a signal with the fourth strength 820a substantially the same strength as the signal with the third strength 810a during the second period 820 between the second time T1 and the third time T2, thereby adjusting the strength of a signal corresponding to the distance between the wearable device 200 and the object.

Accordingly, the wearable device 200 may adaptively adjust the strength of a signal transmitted from the first sensor 210, based on at least one of a position change and a direction change of the wearable device 200 and the position of the object, thereby reducing some (e.g., 810b and 820b in the first graph 800a) of power consumption as shown in the second graph 800b.

Figure 9:
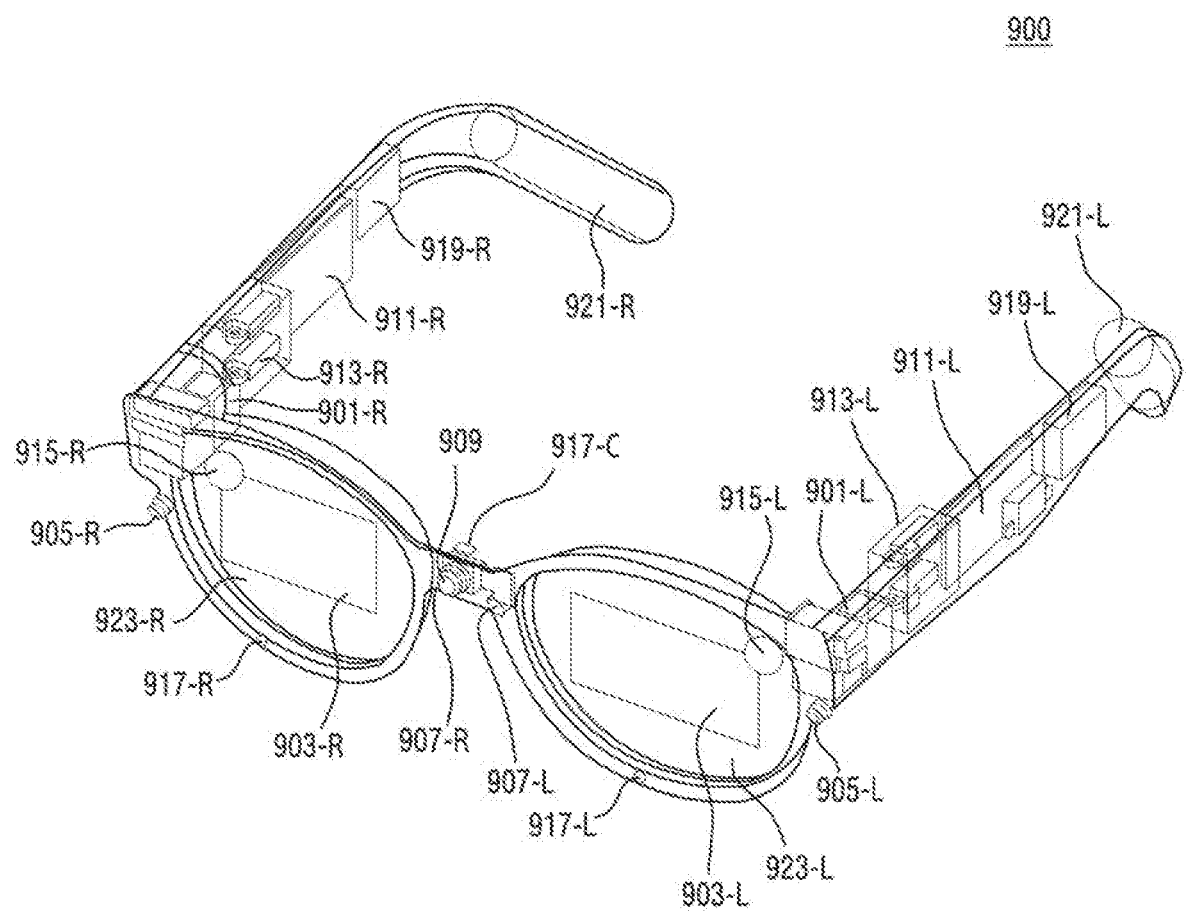
FIG. 9 is a diagram of a wearable device according to an embodiment.

FIG. 9 is a diagram of a wearable device according to an embodiment.

Referring to FIG. 9, in the wearable device 900 (e.g., the wearable device 200 of FIG. 2) according to various embodiments, the physical state of the wearable device 900 may be changed by hinges 913-L and 913-R. For example, the wearable device 900 may be in a state in which eyeglass temples are folded or unfolded by the hinges 913-L and 913-R.

According to an embodiment, the wearable device 900 may include a first light output module 901-L, a second light output module 901-R, a first display 903-L, a second display 903-R, first cameras 905-L and 905-R, second cameras 907-L, 907-R, a third camera 909, a first PCB 911-L, a second PCB 911-R, the hinges 913-L and 913-R, a first optical member 915-L, a second optical member 915-R, microphones 917-L, 917-R, and 917-center (C), speakers 919-L and 919-R, a first battery 921-L, a second battery 921-R, a first transparent member 923-L, and a second transparent member 923-R. According to various embodiments, the wearable device 900 may include an additional component in addition to the components illustrated in FIG. 9, or may omit at least one of the components illustrated in FIG. 9.

According to an embodiment, "R" and "L" positioned at the end of the reference numerals illustrated shown in FIG. 9 may respectively refer to components positioned on the right and left when the wearable device 900 is worn. For example, a component positioned on the left when the wearable device 900 is worn may be driven by power output from the first battery 921-L. A component positioned on the right when the wearable device 900 is worn may be driven by power output from the second battery 921-R.

Although FIG. 9 shows that components (e.g., the first PCB 911-L, the second PCB 911-R, the hinges 913-L and 911-R, the speakers 919-L and 919-R, the first battery 921-L, and the second battery 921-R) disposed on the eyeglass temples are exposed to the outside, which is only for convenience of description, these components may be disposed inside the eyeglass temples and may not be exposed to the outside.

According to an embodiment, the first light output module 901-L and the second light output module 901-R may be referred to as a light output module 901. The first display 903-L and the second display 903-R may be referred to as a display 903 (e.g., the display module 160 of FIG. 1). The first PCB 911-L and the second PCB 911-R may be referred to as a PCB 911. The first optical member 915-L and the second optical member 915-R may be referred to as an optical member 915. The first battery 921-L and the second battery 921-R may be referred to as a battery 921. The first transparent member 923-L and the second transparent member 923-R may be referred to as a transparent member 923.

According to an embodiment, the wearable device 900 may be a wearable electronic device. For example, the wearable device 900 may be a glasses-type wearable electronic device (e.g., augmented reality (AR) glasses, smart glasses, or a head-mounted device). However, the foregoing example is only for illustration, and the disclosure is not limited thereto. The glasses-type wearable device 900 may operate while being worn on a user's face. The transparent member 923 may be a transparent or translucent glass plate, a plastic plate, or a polymer material to enable the user to see the outside even when the wearable device 900 is worn on the user's face. In an embodiment, the first transparent member 923-L may be disposed to face the user's left eye, and the second transparent member 923-R may be disposed to face the user's right eye.

According to an embodiment, the wearable device 900 may obtain (capture) a real-world image via the third camera 909, may receive an AR object related to the position of the obtained image or an object (e.g., a thing or a building) included in the obtained image) from a different electronic devices (e.g., a smartphone, a computer, a tablet personal computer (PC)r a server), and may provide the AR object for the user through the light output module 901, the optical member 915, and the display 903.

According to an embodiment, the first cameras 905-L and 905-R, the second cameras 907-L and 907-R, and the third camera 909 may be utilized to recognize a current scene or environment viewed through the optical member 915 of the wearable device 900.

According to an embodiment, the wearable device 900 may receive an audio signal through the microphones 917-L, 917-R, and 917-C, and may output the audio signal through the speakers 919-L and 919-R.

According to an embodiment, a first charging module may be disposed on the first PCB 911-L. According to an embodiment, the wearable device 900 may charge the first battery 921-L with the first charging module 912-L. According to an embodiment, a second charging module may be disposed on the second PCB 911-R. According to an embodiment, the wearable device 900 may charge the second battery 921-R with the second charging module 912-R.

According to various embodiments, a wearable device (e.g., the wearable device 200 of FIG. 2) may include a first sensor (e.g., the first sensor 210 of FIG. 2), at least one second sensor (the at least one second sensor 220 of FIG. 2), and at least one processor (e.g., the at least one processor 230 of FIG. 2) configured to electrically connected to the first sensor 210 and the at least one second sensor 220, where the at least one processor 230 may be configured to control the first sensor 210 such that the first sensor 210 transmits a signal with a first strength, identify a position of a first object, based on a response signal to the signal with the first strength, control the first sensor 210 such that the first sensor 210 transmits a signal with a second strength corresponding to a first distance (e.g., the first distance D1 of FIG. 5A, FIG. 5B, FIG. 7A, or FIG. 7B) between the wearable device 200 and the first object, based on the identified position of the first object, detect a movement of the wearable device 200 using the at least one second sensor 200, the movement of the wearable device 200 including at least one of a position change of the wearable device 200 and a direction change of the wearable device 200, and determine whether to adjust the second strength, based on at least one of a position and a direction of the wearable device 200 according to the movement of the wearable device 200 and the position of the first object.

According to various embodiments, the at least one processor 230 may identify whether a first movement (e.g., the first movement M1 of FIG. 5A) of the wearable device 200 moving in a first moving direction (e.g., the +x-axis direction of FIG. 5A) using the at least one second sensor 220, may control the first sensor 210 such that the first sensor 210 transmits the signal with the first strength in a first direction (e.g., the +x-axis direction of FIG. 5A) toward the first object when detecting the first movement of the wearable device, and may control the first sensor 210 such that the first sensor 210 transmits a signal corresponding to a second distance (e.g., the second distance D2 of FIG. 5A) between the position of the wearable device 200 determined according to the first movement M1 of the wearable device 200 and the first object and having a different strength from the first strength in the first direction toward the first object after controlling the first sensor 210 to transmit the signal with the first strength in the first direction toward the first object.

According to various embodiments, the at least one processor 230 may control the first sensor 210 such that the first sensor 210 transmits the signal corresponding to the second distance D2 and having the different strength from the first strength in the first direction toward the first object, based on whether a response signal to the signal with the first strength is received from a second object different from the first object, after controlling the first sensor 210 to transmit the signal with the first strength in the first direction toward the first object.

According to various embodiments, the at least one processor 230 may identify a second movement (e.g., the second movement M2 of FIG. 5B) of the wearable device 200 moving in a second moving direction (e.g., a −x-axis direction of FIG. 5B) opposite to the first moving direction using the at least one second sensor 220, and may control the first sensor 210 such that the first sensor 210 transmits a signal corresponding to a third distance (e.g., the third distance D3 of FIG. 5B) between the position of the wearable device 200 determined according to the second movement M2 of the wearable device and the first object and having a different strength from the first strength in the first direction toward the first object when detecting the second movement M2 of the wearable device 200.

According to various embodiments, the first sensor 210 may include a plurality of light emitting units, and the at least one processor 230 may identify a third movement (e.g., the third movement M3 of FIG. 7A) of the wearable device 200 turning in a first turning direction (e.g., the direction between the +x-axis and the −y-axis of FIG. 7A) using the at least one second sensor 220, may control the first sensor 210 such that at least one light emitting unit of the plurality of light emitting units transmits the signal with the second strength in a second direction toward the first object when detecting the third movement M3 of the wearable device 200, and may control the first sensor 210 such that at least one different light emitting unit from the at least one light emitting unit among the plurality of light emitting units transmits the signal with the first strength in a direction different from the second direction toward the first object.

According to various embodiments, the at least one processor 230 may identify a fourth movement (e.g., the fourth movement M4 of FIG. 7B) of the wearable device 200 turning in a second turning direction (e.g., the direction between the +x-axis and the +y-axis of FIG. 7B) opposite to the first turning direction using the at least one second sensor 220, may control the first sensor 210 such that at least one light emitting unit of the plurality of light emitting units transmits the signal with the second strength in a third direction toward the first object when detecting the fourth movement M4 of the wearable device 200, and may control the first sensor 210 such that at least one different light emitting unit from the at least one light emitting unit among the plurality of light emitting units transmits the signal with the first strength in a direction different from the third direction toward the first object.

According to various embodiments, the signal with the first strength transmitted in the direction different from the third direction toward the first object forms a sensing range (e.g., the sensing range R3 of FIG. 7A or FIG. 7B) not overlapping with a sensing range (e.g., the second sensing range R2 of FIG. 7A or FIG. 7B) formed by the signal with the second strength transmitted corresponding to the first distance.

According to various embodiments, at least one of the third movement M3 of the wearable device 200 and the fourth movement M4 of the wearable device 200 may be a state in which the position of the wearable device 200 is fixed.

According to various embodiments, a signal control method of a wearable device 200 may include controlling a first sensor 210 such that the first sensor 210 transmits a signal with a first strength (e.g., operation 310 of FIG. 3), identifying a position of a first object, based on a response signal to the signal with the first strength (e.g., operation 320 of FIG. 3), controlling the first sensor 210 such that the first sensor 210 transmits a signal with a second strength corresponding to a first distance D1 between the wearable device 200 and the first object, based on the identified position of the first object (e.g., operation 330 of FIG. 3), detecting a movement of the wearable device 200 using at least one second sensor 220 (e.g., operation 340 of FIG. 3), the movement of the wearable device 200 including at least one of a position change of the wearable device 200 and a direction change of the wearable device 200, and determining whether to adjust the second strength, based on at least one of a position and a direction of the wearable device 200 determined according to the movement of the wearable device 200 and the position of the first object (e.g., operation 350 of FIG. 3).

According to various embodiments, the signal control method may further include identifying whether a first movement M1 of the wearable device 200 moving in a first moving direction using the at least one second sensor 220 (e.g., operation 410 of FIG. 4), controlling the first sensor 210 such that the first sensor 210 transmits the signal with the first strength in a first direction toward the first object when detecting the first movement M1 of the wearable device 200 (e.g., operation 420 of FIG. 4), and controlling the first sensor 210 such that the first sensor 210 transmits a signal corresponding to a second distance D2 between the position of the wearable device 200 determined according to the first movement M1 of the wearable device 200 and the first object and having a different strength from the first strength in the first direction toward the first object after controlling the first sensor 210 to transmit the signal with the first strength in the first direction toward the first object (e.g., operation 430 of FIG. 4).

According to various embodiments, the controlling of the first sensor to transmit the signal having the different strength from the first strength in the first direction toward the first object (operation 430) may be performed based on whether a response signal to the signal with the first strength is received from a second object different from the first object after controlling the first sensor 210 to transmit the signal with the first strength in the first direction toward the first object.

According to various embodiments, the signal control method may further include identifying a second movement M2 of the wearable device 200 moving in a second moving direction opposite to the first moving direction using the at least one second sensor 220 (e.g., operation 440), and controlling the first sensor 210 such that the first sensor 210 transmits a signal corresponding to a third distance D3 between the position of the wearable device 200 determined according to the second movement M2 of the wearable device 200 and the first object and having a different strength from the first strength in the first direction toward the first object when detecting the second movement M2 of the wearable device 200 (e.g., operation 450).

According to various embodiments, the signal control method may further include identifying a third movement M3 of the wearable device 200 turning in a first turning direction using the at least one second sensor 220 (e.g., operation 610 of FIG. 6), controlling the first sensor 210 such that at least one light emitting unit of a plurality of light emitting units included in the first sensor transmits the signal with the second strength in a second direction toward the first object when detecting the third movement M3 of the wearable device 200 (e.g., operation 620 of FIG. 6), and controlling the first sensor 210 such that at least one different light emitting unit from the at least one light emitting unit among the plurality of light emitting units transmits the signal with the first strength in a direction different from the second direction toward the first object (e.g., operation 630 of FIG. 6).

According to various embodiments, the signal control method may further include identifying a fourth movement M4 of the wearable device 200 turning in a second turning direction opposite to the first turning direction using the at least one second sensor 220 (e.g., operation 640 of FIG. 6), controlling the first sensor 210 such that at least one light emitting unit of the plurality of light emitting units transmits the signal with the second strength in a third direction toward the first object when detecting the fourth movement M4 of the wearable device 200 (e.g., operation 650 of FIG. 6), and controlling the first sensor 210 such that at least one different light emitting unit from the at least one light emitting unit among the plurality of light emitting units transmits the signal with the first strength in a direction different from the third direction toward the first object (e.g., operation 660 of FIG. 6).

According to various embodiments, an electronic device (e.g., the wearable device 200 of FIG. 2) may include a first sensor 210, at least one second sensor 220, and at least one processor 230 configured to electrically connected to the first sensor 210 and the at least one second sensor 220, where the at least one processor 230 may control the first sensor 210 such that the first sensor 210 transmits a signal with a first strength in a first direction, may identify a position of a first object in the first direction, based on a response signal to the signal with the first strength, may control the first sensor 210 such that the first sensor 210 transmits a signal with a second strength corresponding to a first distance D1 between the electronic device 200 and the first object in the first direction, based on the identified position of the first object, may detect a movement of the electronic device 200 using the at least one second sensor 220, the movement of the electronic device 200 including at least one of moving of the electronic device 200 and turning of the electronic device 200, may determine a second distance D1, D2, or D3 between the electronic device 200 and the first object, based on detecting the movement of the electronic device 200, and may control the first sensor 210 such that the first sensor 210 transmits a signal corresponding to the determined second distance D1, D2, or D3 and having a third strength different from the first strength in a second direction toward the first object when the determined second distance D1, D2, or D3 is equal to or greater than the first distance D1.

According to various embodiments, the at least one processor 230 may control the first sensor 210 such that the first sensor 210 transmits the signal with the first strength in a third direction different from the second direction.

According to various embodiments, the at least one processor 230 may control the first sensor 210 such that the first sensor 210 transmits the signal with the first strength in the second direction when the determined second distance D1, D2, or D3 is less than the first distance D1.

According to various embodiments, when the movement of the electronic device 200 is a direction change of the electronic device 200, the third strength may be the same as the second strength.

According to various embodiments, the first sensor 210 may include a plurality of light emitting units, and the at least one processor 230 may control the first sensor 210 such that the first sensor 210 transmits the signal with the third strength in the second direction using at least one light emitting unit among the plurality of light emitting units and transmits the signal with the first strength in a third direction different from the second direction using at least one different light emitting unit from the at least one light emitting unit among the plurality of light emitting units when the second direction is different from the first direction.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Where, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A wearable device comprising:
   a first sensor;
   at least one second sensor; and
   at least one processor configured to:
      control the first sensor to transmit a first signal with a first strength;
      identify a position of a first object based on a first response signal to the first signal;
      based on the identified position of the first object, control the first sensor to transmit a second signal with a second strength corresponding to a first distance between the wearable device and the first object;
      detect, by using the at least one second sensor, a movement of the wearable device, the movement of the wearable device comprising at least one of a position change of the wearable device and a direction change of the wearable device; and
      determine whether to adjust the second strength, based on at least one of the movement of the wearable device and the position of the first object.

2. The wearable device of claim 1, wherein the at least one processor is further configured to:
   identify, by using the at least one second sensor, whether the wearable device is moving in a first moving direction;
   control the first sensor to transmit the first signal in a first direction toward the first object based on identifying that the wearable device is moving in the first moving direction; and
   control the first sensor to transmit a third signal corresponding to a second distance between a position of the wearable device and the first object and having a different strength from the first strength in the first direction.

3. The wearable device of claim 2, wherein the at least one processor is further configured to control the first sensor to transmit the third signal based on whether a second response signal to the first signal is received from a second object different from the first object.

4. The wearable device of claim 2, wherein the at least one processor is further configured to:
   identify, by using the at least one second sensor, whether the wearable device is moving in a second moving direction opposite to the first moving direction; and
   control the first sensor to transmit a fourth signal corresponding to a third distance between the position of the wearable device and the first object and having a different strength from the first strength in the first direction based on identifying that the wearable device is moving in the second moving direction.

5. The wearable device of claim 1, wherein the first sensor comprises a plurality of light emitting units, and
   wherein the at least one processor is further configured to:
      identify, by using the at least one second sensor, whether the wearable device is turning in a first turning direction;
      control the first sensor such that at least one first light emitting unit of the plurality of light emitting units transmits the second signal in a second direction toward the first object based on identifying that the wearable device is turning in the first turning direction; and
      control the first sensor such that at least one second light emitting unit different from the at least one first light emitting unit among the plurality of light emitting units transmits the first signal in a direction different from the second direction toward the first object.

6. The wearable device of claim 5, wherein the at least one processor is further configured to:
   identify, by using the at least one second sensor, whether the wearable device is turning in a second turning direction opposite to the first turning direction;
   control the first sensor such that at least one third light emitting unit of the plurality of light emitting units transmits the second signal in a third direction toward the first object based on identifying that the wearable device is turning in the second turning direction; and
   control the first sensor such that at least one fourth light emitting unit different from the at least one third light emitting unit among the plurality of light emitting units transmits the first signal in a direction different from the third direction toward the first object.

7. The wearable device of claim 6, wherein the first signal transmitted in the direction different from the third direction forms a first sensing range not overlapping with a second sensing range formed by the second signal.

8. The wearable device of claim 6, wherein the wearable device is in a state in which a position of the wearable device is fixed when the wearable device is turning it at least one of the first turning direction and the second turning direction.

9. A signal control method of a wearable device, the signal control method comprising:
   controlling a first sensor to transmit a first signal with a first strength;
   identifying a position of a first object, based on a first response signal to the first signal;
   based on the identified position of the first object, controlling the first sensor to transmit a second signal with a second strength corresponding to a first distance between the wearable device and the first object;
   detecting, by using at least one second sensor, a movement of the wearable device, the movement of the wearable device comprising at least one of a position change of the wearable device and a direction change of the wearable device; and
   determining whether to adjust the second strength, based on at least one of the movement of the wearable device and the position of the first object.

10. The signal control method of claim 9, further comprising:
    identifying, by using the at least one second sensor, whether the wearable device is moving in a first moving direction;

controlling the first sensor to transmit the first signal in a first direction toward the first object based on identifying that the wearable device is moving in the first moving direction; and controlling the first sensor to transmit a third signal corresponding to a second distance between a position of the wearable device and the first object and having a different strength from the first strength in the first direction.

11. The signal control method of claim 10, wherein the controlling of the first sensor to transmit the third signal is performed based on whether a second response signal to the first signal is received from a second object different from the first object.

12. The signal control method of claim 10, further comprising:

identifying, by using the at least one second sensor, whether the wearable device is moving in a second moving direction opposite to the first moving direction; and controlling the first sensor to transmit a fourth signal corresponding to a third distance between the position of the wearable device and the first object and having a different strength from the first strength in the first direction based on identifying that the wearable device is moving in the second moving direction.

13. The signal control method of claim 9, further comprising:

identifying, by using the at least one second sensor, whether the wearable device is turning in a first turning direction;

controlling the first sensor such that that at least one first light emitting unit of a plurality of light emitting units of the first sensor transmits the second signal in a second direction toward the first object based on identifying that the wearable device is turning in the first turning direction; and controlling the first sensor such that at least one second light emitting unit different from the at least one first light emitting unit among the plurality of light emitting units transmits the first signal in a direction different from the second direction toward the first object.

14. The signal control method of claim 13, further comprising:

identifying, by using the at least one second sensor, whether the wearable device is turning in a second turning direction opposite to the first turning direction;

controlling the first sensor such that at least one third light emitting unit of the plurality of light emitting units transmits the second signal in a third direction toward the first object based on identifying that the wearable device is turning in the second turning direction; and controlling the first sensor such that at least one fourth light emitting unit different from the at least one third light emitting unit among the plurality of light emitting units transmits the first signal in a direction different from the third direction toward the first object.

15. The signal control method of claim 14, wherein the first signal transmitted in the direction different from the third direction toward the first object forms a first sensing range not overlapping with a second sensing range formed by the second signal.

16. An electronic device comprising:

a first sensor;
at least one second sensor; and
at least one processor configured to:
control the first sensor to transmit a first signal with a first strength in a first direction;
identify a position of a first object in the first direction, based on a response signal to the first signal;
based on the identified position of the first object, control the first sensor to transmit a second signal with a second strength corresponding to a first distance between the electronic device and the first object in the first direction;
detect, by using the at least one second sensor, a movement of the electronic device, the movement of the electronic device comprising at least one of moving of the electronic device and turning of the electronic device;
determine a second distance between the electronic device and the first object, based on detecting the movement of the electronic device; and
control the first sensor to transmit a third signal corresponding to the second distance and having a third strength different from the first strength in a second direction toward the first object based on determined second distance being equal to or greater than the first distance.

17. The electronic device of claim 16, wherein the at least one processor is further configured to:
control the first sensor to transmit the first signal in a third direction different from the second direction.

18. The electronic device of claim 16, wherein the at least one processor is further configured to:
control the first sensor to transmit the first signal in the second direction based on the determined second distance being less than the first distance.

19. The electronic device of claim 16, wherein, when the movement of the electronic device is a direction change of the electronic device, the third strength is the same as the second strength.

20. The electronic device of claim 16, wherein the first sensor comprises a plurality of light emitting units, and
wherein the at least one processor is further configured to:
control the first sensor to:
transmit the third signal in the second direction by at least one first light emitting unit among the plurality of light emitting units, and
transmit the first signal in a third direction different from the second direction by at least one second light emitting unit different from the at least one first light emitting unit among the plurality of light emitting units based on the second direction being different from the first direction.

* * * * *